Oct. 13, 1925.
A. MEISSNER
1,556,863
AUTOMOBILE SIGNAL
Filed Nov. 15, 1924     2 Sheets-Sheet 1
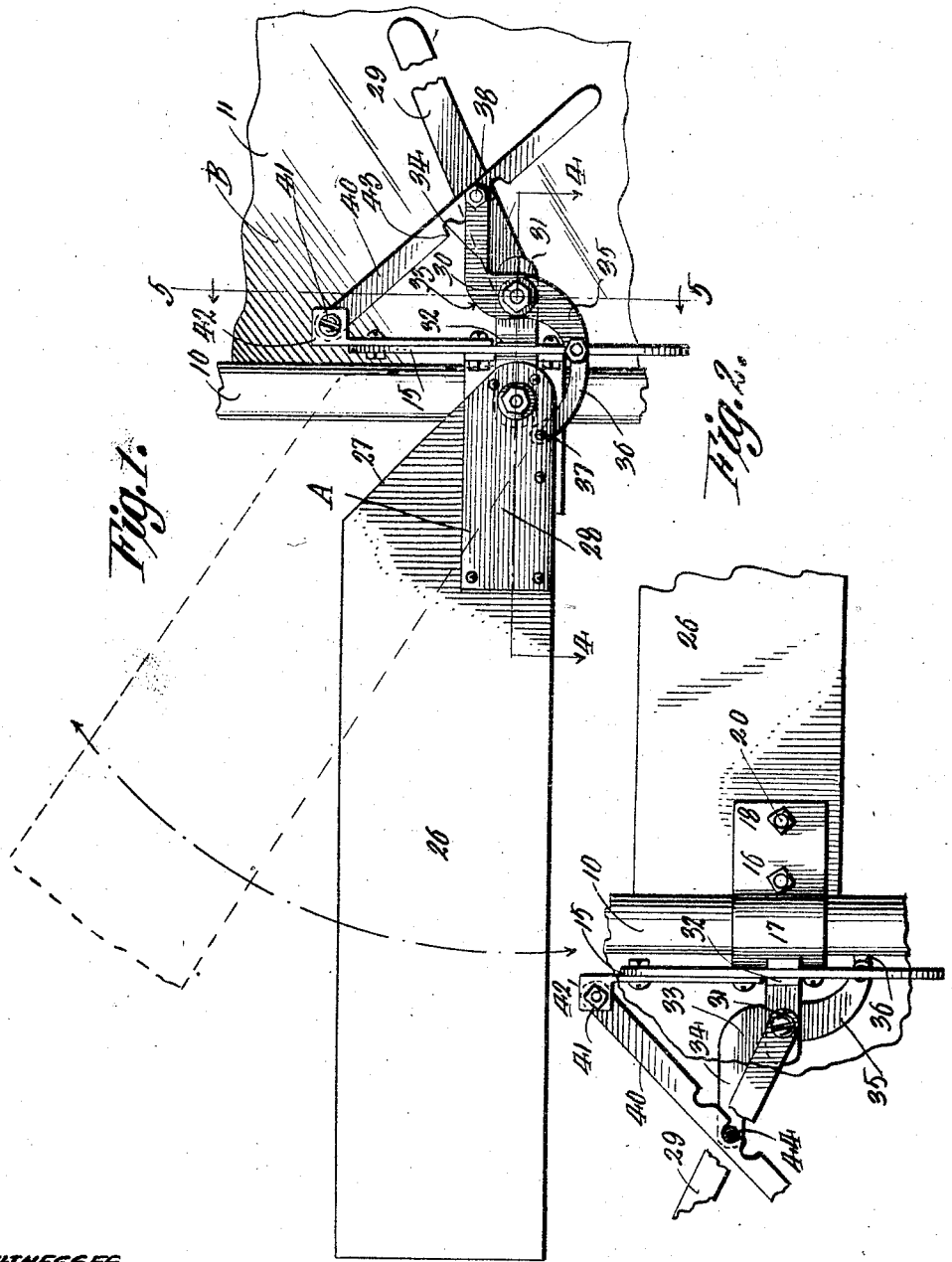
WITNESSES
Inventor
ADOLPH MEISSNER.
By Richard B. Owen
Attorney Oct. 13, 1925.  
A. MEISSNER  
1,556,863  
AUTOMOBILE SIGNAL  
Filed Nov. 15, 1924  
2 Sheets-Sheet 2
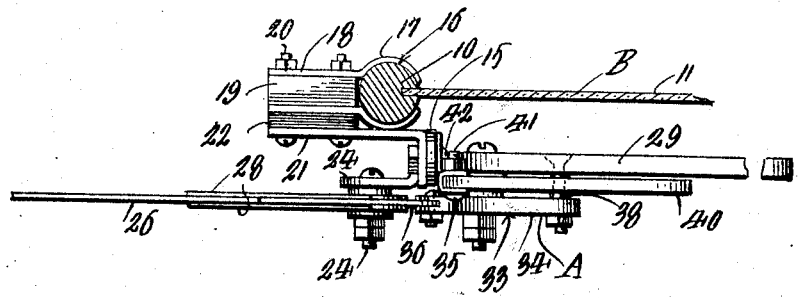
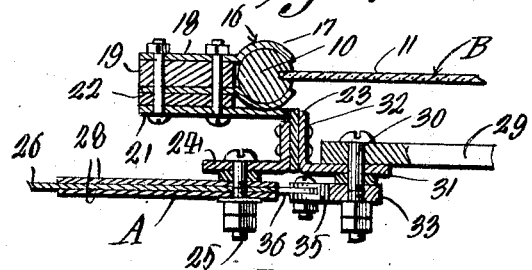
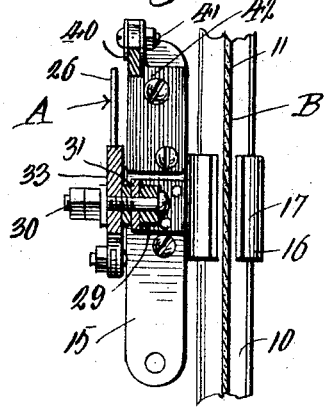
WITNESSES
Inventor
ADOLPH MEISSNER Patented Oct. 13, 1925.

1,556,863

UNITED STATES PATENT OFFICE.

ADOLF MEISSNER, OF GRAND RAPIDS, MICHIGAN.

AUTOMOBILE SIGNAL.

Application filed November 15, 1924. Serial No. 750,100.

*To all whom it may concern:*

Be it known that I, ADOLF MEISSNER, a citizen of the United States, residing at Grand Rapids, in the county of Kent and State of Michigan, have invented certain new and useful Improvements in Automobile Signals, of which the following is a specification.

This invention relates to vehicle appliances or attachments and more particularly to a novel device for indicating to traffic both in front and in rear of a vehicle equipped with the device the intended movements of the said vehicle.

The primary object of the present invention is to provide a direction signal or indicator for automobiles embodying a swinging semaphore arm and novel means for operating the arm and for holding the same in any preferred signalling position.

Another object of the invention is to provide an automobile direction indicator including a support, having means for permitting the attaching thereof to vehicles of different types, a semaphore arm pivotally carried by the support, an operating lever carried by the support and located inside the vehicle having novel means operatively connecting the same with the arm, and a swinging latch lever disposed inside of the vehicle and adjacent to the lever for holding the arm in any desired adjusted position.

A still further object of the invention is to provide an improved direction indicator for automobiles, which will be durable and efficient in use, one that will be simple and easy to manufacture and one which can be placed upon the market and incorporated with an automobile at a small cost.

With these and other objects in view, the invention consists in the novel construction, arrangement and formation of parts, as will be hereinafter more specifically described, claimed and illustrated in the accompanying drawings, in which drawings, Figure 1 is a rear elevation of the improved signal showing the same incorporated with the windshield of an automobile, the semaphore arm being shown in one of its adjusted signalling positions, Figure 2 is an elevation of the improved signal looking in the opposite direction from Figure 1 showing parts thereof broken away and in section, Figure 3 is a top plan view of the improved signal, Figure 4 is a horizontal section through the improved signal taken on the line 4—4 of Figure 1 looking in the direction of the arrows, Figure 5 is a vertical section through the improved signal taken on the line 5—5 of Figure 1 looking in the direction of the arrows.

Referring to the drawings in detail, wherein similar reference characters designate corresponding parts throughout the several views the letter A generally indicates the improved signal and B a motor vehicle with which the same can be associated. The vehicle B forms no part of the present invention and has simply been shown to illustrate the use of the improved signal and only a part of the vehicle has been illustrated.

The part of the vehicle B as shown consists of the usual windshield standard 10 and wind shield transparent panels 11.

While in the drawings I have shown the signal attached directly to the wind shield standard 10, it is to be understood that the same can be connected with any preferred part of the vehicle and with any type of vehicle either of the closed or opened type, the only change necessary being in the type of clamp employed for holding the signal in place.

The improved signal A comprises a supporting plate 15 to which is rigidly connected a clamp 16, which has been especially designed for engaging a wind shield standard. This clamp 16 includes a pair of gripping jaws 17 having spaced parallel shanks 18, which are held in proper relation by spacing block 19. The spacing block 19 and the shanks 18 of the jaws 17 are connected by means of adjustable bolts 20 to a laterally extending plate 21 connected with the said supporting plate 15. These clamps can be held away from the supporting plate 21 by a spacing plate 22.

By tightening or loosening the bolts 20, the jaws 17 can be brought toward or away from the wind shield standard. The outer face of the supporting plate 15 has riveted or otherwise secured thereto a bracket 23 embodying a laterally extending arm 24 which supports a pivot bolt 25. This pivot bolt rotatably supports the semaphore arm 26, which can be of any desired shape. The semaphore arm as shown is preferably made from sheet metal and can have the opposite sides thereof painted a distinctive color such as red or the like. While the arm as shown simply consists of a flat sheet metal plate, it is to be understood that the can could be made of a hollow construction for the reception of an illuminating electric light or the like. The inner edge of the semaphore arm 26 is cut diagonally as at 27 to permit the arm to be raised at an angle to the horizontal as shown in dotted lines in Figure 1 without striking the supporting plate 15. If so desired the inner end of the plate or semaphore arm 26 can be reenforced in any desired way to form a hub or bearing for engaging the pivot bolt 25 and in the drawings I have shown side reenforcing plates 28 riveted or otherwise secured to the inner end of the arm.

In order to bring about the raising and lowering of the semaphore arm to its various adjusted positions, I provide an operating lever 29 which extends preferably into the vehicle, so that the lever can be readily manipulated by the driver of the vehicle. This lever 29 has its inner end rotatably mounted upon a suitable supporting bolt or shaft 30 which is carried by the laterally extending arm 31 of a supporting bracket 32 which is secured to the opposite face of the supporting plate 15 from the bracket 24. If so desired the same bolts or rivets utilized for holding the bracket 24 in place can be used for holding the bracket 32 in place.

This bolt or shaft 30 also rotatably supports a double ended lever 33 which includes an upper inwardly extending arm 34 and an arcuate depending arm 35. This double ended lever 35 is mounted upon the pivot bolt or shaft 30 at a point intermediate the arms 34 and 35. The free end of the arcuate depending arm 35 of the lever 33 has pivotally connected thereto the arcuate link 36 which in turn is pivotally connected by means of bolts 37 to the semaphore arm 26 at one side of the pivot point thereof. As shown the arcuate link 36 is received between the reenforcing plates 28 and if so desired the lower edge of the arm can be cut away to define a pocket to receive the said arcuate link. The free end of the upper arm 34 of the lever 33 is pivotally connected by means of a bolt 38 with the operating lever 29 at the pivot point of the said lever.

It is obvious that by operating the lever that the semaphore arm 26 can be readily swung to any desirable signalling position and that when the lever is released that the arm will drop by gravity to its normal depending inoperative position.

Any system can be used for signalling with the arm, and if so desired, when the arm is swung to a slightly raised position at an angle to and below the horizontal the same can indicate that the vehicle is going to turn to the left. When the semaphore arm is disposed straight out or in a horizontal position, the same can indicate that the vehicle is coming to a dead stop. If the arm is raised to an inclined position above the horizontal, the same can indicate that the vehicle is going to turn to the right.

I have provided a swinging latch lever 40 for holding the semaphore arm in any one of its three adjusted positions and this latch lever 40 is pivotally connected at its upper inner end on a bolt 41 which is carried by a supporting bracket 42 which is bolted or otherwise secured to the supporting plate 15. The lower longitudinal edge of the lever 40 is provided with a plurality of notches 43 and these notches are adapted to engage the pivot bolt 38 carried by the operating lever 29, which will hold the lever against movement.

After the semaphore arm has been moved to its adjusted position, the latch will automatically hold the arm in place, in view of the fact that the latch lever will be normally held in engagement with the pivot bolt 38 by its own weight. When it is desired to permit the semaphore arm to assume its normal inoperative non-signalling position, it is merely necessary to raise the latch lever from out of engagement with the said bolt.

In order to facilitate the movement of the bolt 38 and the latch lever relative to one another I prefer to mount an anti-friction roller 44 on the bolt between the operating lever 29 and the arm 34 of the two arm lever 33. This roller 44 also serves as means for normally spacing the operating lever 29 from the double arm lever 33 so as to insure sufficient space between these parts to permit the latch lever to ride therebetween.

From the foregoing description, it can be seen that I have provided an improved direction signal for automobiles, which can be readily manipulated from the interior of the automobile and which will serve in an efficient manner to indicate the traffic both in front and rear of the vehicle equipped with the signal the intended change of course thereof.

Changes as to details may be made without departing from the spirit or the scope of this invention, but:—

What I claim as new is:—

1. In a direction signal for automobiles, a supporting plate, means associated with the plate for permitting the connection thereof with an automobile, a bracket secured to the plate and extending outwardly from one face thereof, a second bracket secured to the opposite face of the plate and extending outwardly therefrom, a semaphore arm pivotally secured to the first mentioned bracket, an operating lever pivotally secured to the second mentioned bracket and adapted to extend into the interior of an automobile, a double arm lever pivotally secured at a point intermediate its end to the second mentioned bracket, means pivotally connecting one arm to the operating lever inwardly of the pivot point of said lever, a link having its opposite terminals pivoted respectively to the semaphore arm at one side of the pivot point thereof and to the free end of the other arm of said two armed lever.

2. In a direction signal for automobiles, a supporting plate, means carried by the plate for permitting the connection thereof with an automobile, a semaphore arm pivotally secured to the plate and extending laterally from one face thereof, a pivoted operating lever carried by the plate and extending laterally from the opposite face thereof, means operatively connecting the lever with the semaphore arm for permitting the operation of the arm by said lever, and a latch bar pivoted to the upper end of the supporting plate arranged to normally engage the operating lever for holding the same against movement and the semaphore arm in an adjusted position, the latch bar having its free end extending below the operating lever and adjacent thereto.

3. In a direction signal for motor vehicles, a supporting plate, means carried by the plate for engagement with an automobile, a semaphore arm pivotally associated with the supporting plate, an operating lever pivotally associated with the plate and extending in opposite direction from the semaphore arm, a double armed lever associated with the plate and rockably mounted at a point intermediate its ends, a pivot bolt connecting the free end of one arm of the lever to the operating lever, an arcuate link having its opposite terminals pivoted respectively to the semaphore arm at one side of the pivot point thereof and to the free end of the other arm of the two armed lever, and a latch lever pivotally associated at its inner end to the upper end of said face plate above the operating lever and having a plurality of notches therein arranged to engage the pivot bolt used for connecting the operating lever with one arm of the two armed lever for holding the operating lever and the semaphore arm against movement.

In testimony whereof I affix my signature.

ADOLF MEISSNER.